United States Patent
Fox et al.

(10) Patent No.: US 8,961,362 B2
(45) Date of Patent: Feb. 24, 2015

(54) MODULAR ASSEMBLY FOR AN INTEGRATED FLEX PIN DRIVE WITH GENERATOR

(75) Inventors: Gerald P. Fox, Massillon, OH (US); Hans Landin, Massillon, OH (US)

(73) Assignee: The Timken Company, North Canton, OH (US)

( * ) Notice: Subject to any disclaimer, the term of this patent is extended or adjusted under 35 U.S.C. 154(b) by 356 days.

(21) Appl. No.: 13/505,352

(22) PCT Filed: Oct. 7, 2010

(86) PCT No.: PCT/US2010/051790
§ 371 (c)(1),
(2), (4) Date: May 30, 2012

(87) PCT Pub. No.: WO2011/056344
PCT Pub. Date: May 12, 2011

(65) Prior Publication Data
US 2012/0231923 A1    Sep. 13, 2012

Related U.S. Application Data

(60) Provisional application No. 61/249,434, filed on Nov. 3, 2009, provisional application No. 61/290,590, filed on Dec. 29, 2009.

(51) Int. Cl.
*F16H 57/021* (2012.01)
*F16H 3/52* (2006.01)
(Continued)

(52) U.S. Cl.
CPC  *F03D 11/02* (2013.01); *F16H 1/22* (2013.01); *F16H 37/0833* (2013.01); *F05B 2260/40311* (2013.01); *F16H 2057/0335* (2013.01); *Y02E 10/722* (2013.01)
USPC .......................................... 475/337; 475/330

(58) Field of Classification Search
CPC ......... F16H 1/46; F16H 1/28; F16H 37/0833; F16H 2057/0335; F03D 7/06; F05B 2260/40311

USPC .................................. 475/329, 330, 337, 344
See application file for complete search history.

(56) References Cited

U.S. PATENT DOCUMENTS 5,288,556 A     2/1994  Lemelson
8,192,323 B2 *  6/2012  Fox ............................. 475/347
(Continued)

FOREIGN PATENT DOCUMENTS

DE         10318945 B3    10/1994
DE       102007047317     4/2009
(Continued)

OTHER PUBLICATIONS

Machine Translation of DE10318945.*
(Continued)

*Primary Examiner* — Justin Holmes
*Assistant Examiner* — Stacey Fluhart
(74) *Attorney, Agent, or Firm* — Michael Best & Friedrich LLP

(57) ABSTRACT

A compact modular assembly of a geared power train (100) and generator (400) suitable for use in a wind turbine application to maximize a step-up ratio between an input and output within a limited radial space. The power train is configured as a hybricyclic split-compound planetary gearing system with a grounded closed carrier flex pin system in a high torque stage (A), and an open carrier flex pin system in a low torque stage (B), having a step up ratio of approximately 30:1. To facilitate modular assembly and disassembly of the power train and generator, each component is mounted independently to opposite sides of a common support structure (500) anchored to a bedplate (502).

9 Claims, 2 Drawing Sheets

(51) Int. Cl.
  *F03D 11/02* (2006.01)
  *F16H 1/22* (2006.01)
  *F16H 37/08* (2006.01)
  *F16H 57/033* (2012.01)

(56) References Cited

U.S. PATENT DOCUMENTS

2004/0235604 A1* 11/2004 Fox ................................ 475/183
2005/0075211 A1* 4/2005 Fox et al. ....................... 475/348
2005/0250616 A1* 11/2005 Beltowski ..................... 475/337
2008/0194378 A1* 8/2008 Fox ................................ 475/347
2010/0113210 A1* 5/2010 Lopez et al. .................. 475/331
2010/0120576 A1* 5/2010 Satou et al. ................... 475/348
2011/0165983 A1* 7/2011 Fox ................................ 475/149

FOREIGN PATENT DOCUMENTS

EP 1045139 10/2000
WO 2010030724 3/2010

OTHER PUBLICATIONS

Notification of Transmittal of The International Search Report and Written Opinion of International Searching Authority, or the Declaration No. PCT/US2010/051790: filed Oct. 7, 2010.

* cited by examiner

MODULAR ASSEMBLY FOR AN INTEGRATED FLEX PIN DRIVE WITH GENERATOR

CROSS-REFERENCE TO RELATED APPLICATIONS

The present application is the United States National Stage under 35 U.S.C. §371 of International Application Serial No. PCT/US2010/051790, having an international Filing Date of Oct. 7, 2010. International Application Serial No. PCT/US2010/051790 is related to, and claims priority from, U.S. Provisional Patent Application Ser. No. 61/249,434 filed on Nov. 3, 2009, and further claims priority from U.S. Provisional Patent Application Ser. No. 61/290,590 filed on Dec. 29, 2009, both of which are herein incorporated by reference.

STATEMENT REGARDING FEDERALLY SPONSORED RESEARCH

Not Applicable.

BACKGROUND OF THE INVENTION

The present invention is related generally to power train systems in wind turbines, and specifically, to an improved modular wind turbine power train system consisting of a compound split planetary gearing system incorporating a closed carrier flex pin system in a high torque stage and an open carrier flex pin system in a low torque stage, coupled to a generator in a modular assembly mounted on a common support structure.

Wind turbine designers are developing new and improved system architectures that are aimed at producing lean and reliable machines. One solution being pursued is a hybrid wind turbine which is a combination of a simplified power train (commonly a single-stage planetary gearing system) and a mid-speed generator. To make this configuration as lean as possible, if a higher step up ratio in the planetary gearing system is applied, a reduced size, faster running generator can also be applied. In other words, if the wind turbine rotates at a given speed of "a" revolutions per minute (rpm), and if the planetary gearing system step up ratio is "b", the generator will rotate at a speed of (a×b). The higher the step up ratio "b" is, the faster the generator will rotate. As a general rule, a smaller generator that rotates faster will be lighter in mass and lower in cost, thus leading to a leaner system design. Therefore, there is an industry need to increase the step up ratio "b" within as small a space as possible, and with as small a mass as possible.

Depending upon the speed radio desired, the power train can be configured as either a planetary system, a star system, or a combination thereof. A planetary gearing system is normally comprised of a sun gear in the center, orbiting planet gears (usually but not always three in number) in mesh with the sun gear, a rotating planetary carrier (coaxial with the sun gear) which is a structural member that holds the planet gears in a fixed relative position, and a ring gear which is also coaxial with the sun gear that surrounds and meshes with all the orbiting planet gears. Input and output shafts extend from the sun gear and carrier respectively. In operation, the input shaft rotatably drives the sun gear, compelling each planet gear to rotate about its own axis and, because the ring gear is mechanically grounded, causing the planet gears to orbit the sun gear. the planet gear orbital motion turns the planet carrier, and hence the output shaft in the same direction as the input shaft. Traditionally, each of the planet gears is supported by one or more rows of planetary bearings which are supported on a non-rotating, but orbiting, pin that is fixed at each end to a closed planetary carrier. This arrangement theoretically splits the input torque along a number of equal load paths corresponding to the number of planet gears, and in so doing, reduces the magnitude of the gear forces acting at each gear mesh to a correspondingly smaller number.

An alternative configuration is a star system, which is similar to the planetary system except that the planet carrier is mechanically grounded and the ring gear is rotatable, with the output shaft extending from the ring gear. Because the planet carrier is grounded, the planet gears cannot orbit the sun and therefore are referred to as star gears. In operation, the input shaft drive the sun gear, compelling each star gear to rotate about its own axis. The rotary motion of the star gears turns the ring gear, and hence the output shaft, in a direction opposite that of the input shaft.

Gears in a planetary gearing system are normally designed as spur, helical, or a double helical varieties. Regardless of which gear design is used, there are two commonly observed drawbacks. The first is that machining tolerances necessarily create variation in clearances among all the gear meshes. This means that as torsion is applied into the gearing system, the gear mesh with least clearance will initially begin supporting the load by itself, until this gear mesh deflects enough so that the gear mesh with the next least clearance begins supporting the load. This phenomenon will progress until all the entire load is fully supported by some number of the gear meshes. In other words, some gear meshes will support more load than others. There are means for introducing flexibility into the gear meshes to restore equalization of loads in the gear meshes, one being use of a floating sun gear in a three planet system.

The second drawback to a conventional planetary gearing system which employs a closed planetary carrier having two walls connected by webbing is that applied torsion will twist the carrier, advancing one end of the planetary pin rotationally about the axis of the carrier ahead of the other end. This advancement misaligns the planetary gears with the mating sun gear and ring gear. The planetary gear bearings will also be subjected to this same amount of misalignment.

Generally, the output shaft of the planetary gearing system in a wind turbine is coupled directly to the generator, allowing rotation of the wind turbine blades to drive the generator through the planetary gearing system. To achieve this direct coupling, generators have been either supported directly on the output shaft, such as shown in WO 2009-100720 A2 to Innovative Windpower AG, or have been supported directly on the grounded housing of the planetary gearing system. The primary disadvantage of these configurations is apparent when servicing either the planetary gearing system or the generator, as due to the integral coupling and assembly thereof, both components must be removed together to enable the servicing of either unit. Furthermore, to access the main shaft of the planetary gearing system which is supporting and/or driving the generator, the nose cone and turbine rotor assembly must be removed from the wind turbine to gain access to the upwind end of the drive Accordingly, it would be advantageous to provide a geared power train for use in a wind turbine application which is configured to maximize the step-up ratio "b" within a limited space, allowing for lighter mass generators and lower overall system costs, and which has a modular assembly, allowing for servicing and/or removal of either the generator or the planetary gearing system without requiring disassembly of the remaining components.

BRIEF SUMMARY OF THE INVENTION

Briefly stated, the present disclosure provides a modular assembly of a driving power train and a driven generator, such as for use in a wind turbine application, to maximize a step-up ratio within a defined radial space. In a first embodiment the power train is configured as a hybricyclic or split-compound planetary gearing system with a high-torque stage and a low-torque stage. The high-torque stage consists of a grounded closed carrier flex pin star gear system in a high torque stage, and the low torque stage consists of an open carrier flex pin planetary gear system. The high- and low-torque stages cooperatively establish a step-up ratio between an input shaft and an output shaft of approximately 30:1. To facilitate modular assembly and disassembly of the power train and generator, each component is mounted to opposite sides of a common support structure, which may be anchored to a fixed bedplate.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
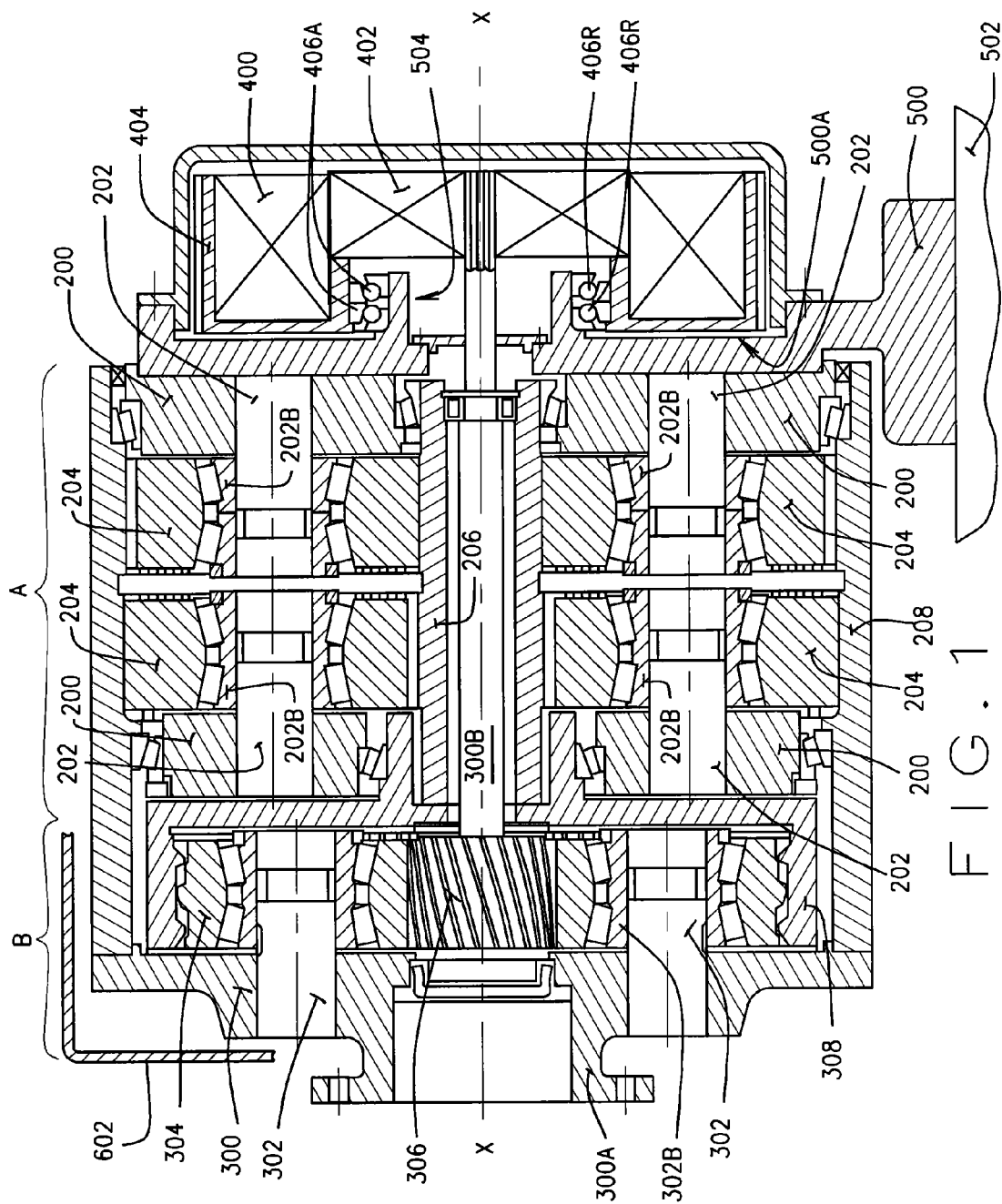
FIG. 1 is a sectional view of a planetary gearing system of the present disclosure incorporating a hybricyclic power train with a closed carrier flex pin star gear system in a high torque stage, and an open carrier flex pin planetary gear system in the low torque stage, each mounted to one side of a common support structure, opposite from a driven generator.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures, a first embodiment of a power train of the present disclosure is shown at 100 in FIG. 1. The power train 100 is a modular hybricyclic (split-compound) planetary gearing system consisting of two stages, a high torque stage (A) and a low torque stage (B). Although described herein generally in the context of a wind turbine application, wherein the hybricyclic planetary gearing system is coupled between a wind turbine blade assembly and a generator, those of ordinary skill in the art will recognize that the power train 100 may be utilized in any of a variety of applications requiring a compact power train having the desired step-up ratios without departing from the scope of the present disclosure.

The first stage, the high-torque stage shown at "A", is a star gear system comprised of a closed or grounded double-wall carrier 200 having two inwardly projecting arrays of internally opposing flex pins 202 for supporting associated star gears 204 between the walls of the carrier 200. Each of the star gears 204 is mated with a small diameter sun gear 206, axially contained within the closed carrier 200, and a common ring gear 208 which rotates about the axis of the sun gear 206, radially outward from the carrier 200. Preferably, one array of the opposing flex pings is rotationally offset about the axis of the sun gear 206 relative to the other array, such that the associated star gears 206 are correspondingly rotationally offset, whereby each star gear 206 is engaged with said sun gear and said surrounding ring gear 208 at a unique rotational position to achieve a more uniform load distribution.

The second stage, shown at "B", is a low-torque planetary gear system comprising an open single-wall carrier 300 coupled between an input shaft 300A and the ring gear 208 of the high-torque stage, and having an array of projecting flex pins 302 supporting an array of associated planet gears 304. Each of the planet gears 304 is mated with a small diameter sun gear 306 coupled to the output shaft 300B, and a common ring gear 308, which in turn, is coupled to the sun gear 206 of the high-torque stage A. The specific sizes of the various gears are selected to achieve a step-up ratio of at least 30:1 between the input shaft 300A integrated into the open carrier 300, and the output shaft 300B coupled to the sun gear 306.

Figure 2:
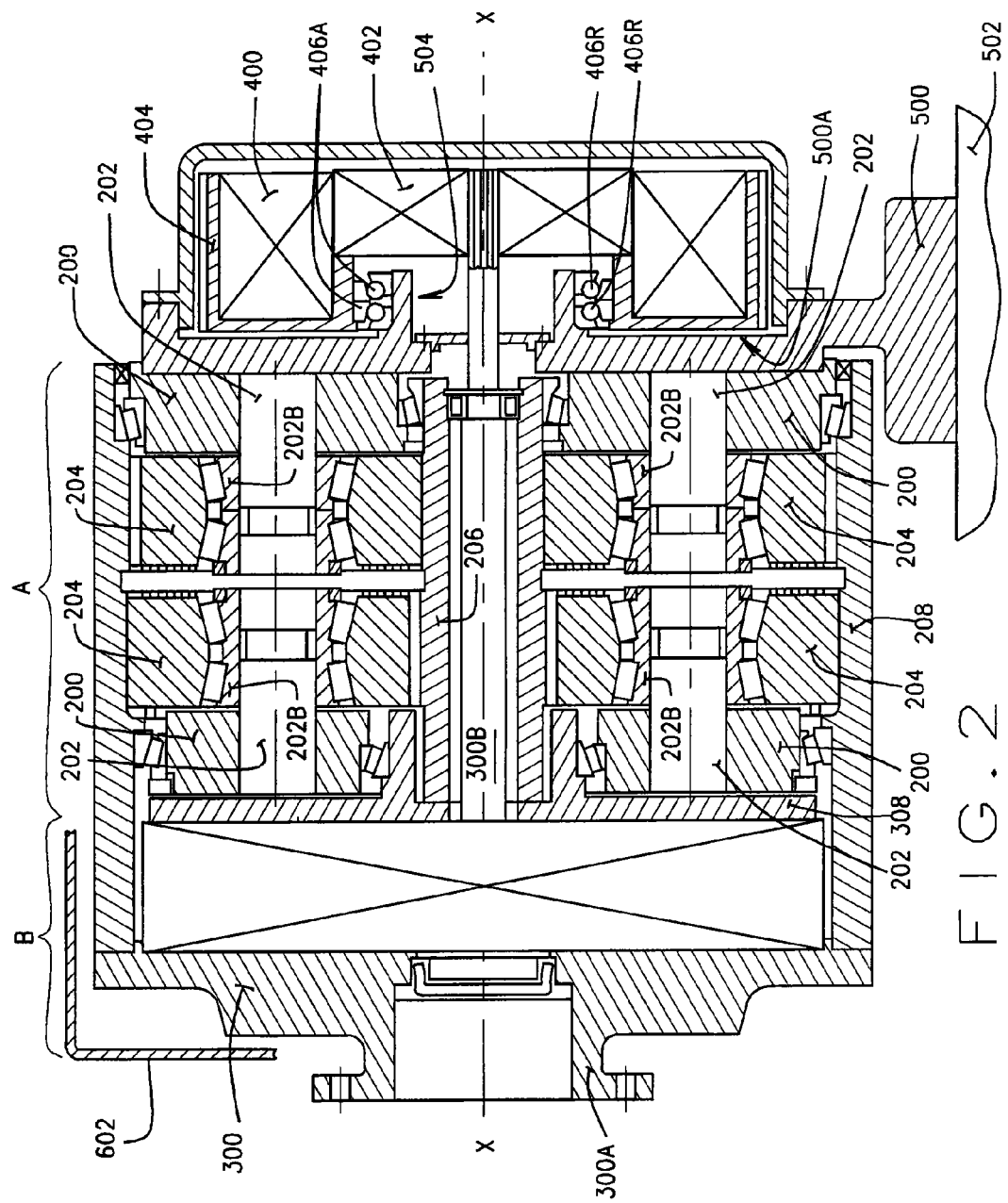
FIG. 2 is a sectional view of an alternate configuration of a planetary gearing system of the present disclosure incorporating a hybricyclic power train with a closed carrier flex pin star gear system in a high torque stage, and a generic low torque stage, each mounted to one side of a common support structure, opposite from a driven generator.

Those of ordinary skill in the art will recognize that a variety of different gear systems may be employed at the low-torque stage B, to convey the applied torque from the input shaft 300A to the high-torque stage "A" and to drive the output shaft 300B, without departing from the scope of the present disclosure, such as shown generically at FIG. 2. For example, the open carrier flex pin system in the low torque stage "B" may employ either helical or spur gears at the planet 304 and sun 306 gears, however, helical gears are generally preferred because the rotational speed of the planet and sun gears is relatively fast, increasing the potential for generating gear noise. Helical gears can normally be designed to operate more quietly to reduce the overall gear box noise level. Optional coatings on one or more of the various gear components in both the high- and low-torque stages, such as diamond-like coatings (DLC), can by utilized to improve the wear characteristics of the gear components, friction, and/or gear noise levels.

With each carrier 200, 300, the flex pins 202 and 302 are cantilevered from carrier walls to operatively support the star gears 204 and/or planet gears 304 on associated bearings 202B, 302B. The flex pins 202 and 302 are each engineered to insure sufficient flexibility to improve load equalization among the star gears 204 and planet gears 304 in each of the high- and low-torque stages, and to provide a bending pattern that maintains optimum gear mesh alignment throughout an operative range of loading for the power train 100. Optimum gear mesh alignment aids in ensuring proper distribution of loads throughout the components of the power train 100.

Utilizing the power train 100 configuration of the present disclosure, a step-up ratio between the input shaft 300A and output shaft 300B may be increased in a very power dense space by a factor of 1.5 to 3.5 times over conventional power train configurations, permitting use of a smaller diameter generator 400. For a wind turbine application, the combination of a power dense power train 100 and small diameter generator 400 will decrease up-tower mass, and provide downsizing opportunities for the tower support structures in the remainder of the wind turbine structure. Further downsizing of the power train 100 can be achieved if maximum loading is controlled by placing a torque limiting, torque transfer device either in front of, or behind, the power train 100.

An exemplary configuration of the power train 100, coupled in a modular fashion to an smaller-diameter electrical generator 400, is shown in FIG. 1. A common support structure 500 is secured to a bedplate 502 or other fixed mounting point to support the power train 100 and driven generator 400. The electrical generator 400, or other driven component (not shown), is mounted to one side 500A of the common support structure 500, and is coupled to the output shaft 300B of the power train 100 passing through the support structure 500 by a torque limiting coupling 402, such as a clutch or drive flange. The generator armature 404 is carried by a bearing assembly 406 supported against a outer diameter of a concentric stub shaft 504 extending outward from the face 500A of the common support structure 500. As shown in FIG. 1, the bearing assembly 406 may consist of two rows of spherical rolling elements 406R mounted about the outer diameter of the stub shaft 402, with a rotor 404 of the generator coupled to an outer race 406a of the bearing assembly 406. It will, however, be recognized that the bearing assembly 406 is not limited to the specific configuration shown in the figures, and that a variety of different configurations may be utilized, including the use of cylindrical or tapered rolling elements.

With the power train 100 and generator 400 mounted to opposite sides of a support structure 500, a wind turbine may be assembled with a first module defined by a main shaft support system adjacent to a main turbine rotor (not shown), and a second module defined by the combination of the power train 100 and the electric generator 400 of the present disclosure, normally located towards the back of a wind turbine nacelle. The later module which combines the hybricyclic power train 100 with the generator 400 effectively positions both components from opposite sides of the common central support post 500, making it possible to remove the hybricyclic power train 100 from the second module without disturbing the generator 400, or conversely, to remove the generator 400 from the second module without disturbing the hybricyclic power train 100.

As is apparent from the figures, during operation, the external surface of the power train 100 is rotating, since it is are driven by the input shaft 300A and defines the high-torque stage "B" ring gear 208. A low cost external shroud 602 is preferably positioned and anchored to either the central support post 500 or to the bedplate 600 to surround the moving component, and to insure operator safety.

The modular configuration of the power train 100 and the generator 400 provides improved serviceability made possible by the fact that the power train 100 is suspended from the central support post 500 which in turn is anchored to the bedplate 502, while the generator 400 is suspended from the opposite side of the central support post 500. The central support post 500 can either be fixed in its longitudinal position on the bedplate 502, or it can be designed to permit axial repositioning relative to the bedplate 502. For example in a wind turbine application, the central support 500 may be moved back and away from a nose cone and a main shaft support structure during any servicing event of the power train 100 of the module to gain easier access and to permit removal of long parts that comprise the power train 100.

With previous designs of a fully integrated hybricyclic gearing system incorporating main shaft bearings, any servicing or replacement of the power train planetary gearbox in a wind turbine application required removal of the nose cone and rotor assembly from the wind turbine to gain access to the upwind end of the drive. By using a combination of a main shaft support module in of any of a variety of configurations (not shown) and a power train/generator module of the present disclosure mounted to a common support structure, easier and less costly access is made possible to the power train and generator because other components such as the nose cone and rotor need not be removed by a crane, thereby decreases the costs associated with servicing either the power train or generator.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A modular power train for a wind turbine having a nose cone and a rotor assembly, the modular power train comprising:
   an input shaft (300A) coupled to, and driven by, a source of applied torque;
   an output shaft (300B) coupled to, and driving, a load (400);
   a central support structure (500), said central support structure mounted to a supporting bedplate (502) and having an opening for passing said output shaft;
   a split-compound planetary gearing system (100) mounted to a first axial side of said central support structure, said planetary gearing system including a high-torque stage (A), and a low-torque stage (B), said split-compound planetary gearing system configured to transfer torque from said input shaft to said output shaft through said high-torque stage and said low-torque stage;
   wherein said high-torque stage (A) incorporates two adjacent arrays of star gears (204) disposed within a closed carrier (200) having opposite end walls and that is fixed against rotation, each star gear array consists of a plurality of star gears supported by flex-pins (202) cantilevered from an associated end wall of said closed carrier, each of said star gears rotationally engaged with a common ring gear (208) that is coupled to said input shaft (300A) and that is rotatable relative to the closed carrier (200), and further rotationally engaged with a common sun gear (206) coupled to said low-torque stage (B); and
   wherein said load is mounted to a second axial side of said central support structure opposite from said split-compound planetary gearing system, said load coupled to, and driven by, said output shaft passing through said opening in said central support structure; and
   wherein said split-compound planetary gearing system is coupled to said central support structure (500) independently of said load (400) such that said split-compound planetary gearing system can be removed from said central support structure without removing said load from said central support structure and without removing the nose cone and the rotor assembly from the wind turbine.

2. The modular power train of claim 1, wherein said source of applied torque is the wind turbine rotor assembly; and wherein said load is an electric generator.

3. The modular power train of claim 1 wherein said output shaft (300B) is coupled to said load by a torque limiting coupling (402).

4. The modular power train of claim 1 wherein said high-torque stage (A) and said low-torque stage (B) are cooperatively configured to provide a high step-up ratio between said input shaft (300A) and said output shaft (300B), said high step-up ratio being at least 30:1.

5. The modular power train of claim 1 wherein each of said star gears (204) has an axis of rotation about the flex-pin (202) upon which it is supported, and wherein said axis of rotation associated with the star gears of a first of said adjacent arrays within said closed carrier (200) are rotationally offset about an axis of said common sun gear (206) from said axis of rotation associated with the star gears (204) of the second of said adjacent arrays within said closed carrier (200), whereby each of said star gears (204) engage said common sun gear (206) and said common ring gear (208) at separate rotational positions.

6. The modular power train of claim 1 wherein each star gear array consists of three equidistantly-spaced star gears (204).

7. The modular power train of claim 1 wherein said low-torque stage (B) incorporates a plurality of equidistantly-spaced planet gears (304) each supported by an associated flex-pin (302) distinct from the flex-pins (202) of the high-torque stage (A) and cantilevered from an end wall of an open carrier (300), each of said planet gears (302) rotationally engaged with a common sun gear (306) coupled to said output shaft (300B) and distinct from the common sun gear (206) of the high-torque stage (A), and further rotationally engaged with a common ring gear (308) coupled to said high-torque stage (A) and distinct from the common ring gear (208) of the high-torque stage (A).

8. The modular power train of claim 1 wherein at least one gear component of said split-compound planetary gearing system (100) is surface coated with a diamond-like coating to increase durability.

9. The modular power train of claim 1, wherein said load can be removed from said central support structure without removing said split-compound planetary gearing system from said central support structure.

* * * * *